(12) United States Patent
Rashidi

(10) Patent No.: US 7,540,706 B2
(45) Date of Patent: Jun. 2, 2009

(54) WIND HARNESSING SYSTEM

(75) Inventor: Majid Rashidi, Pepper Pike, OH (US)

(73) Assignee: Cleveland State University, Cleveland, OH (US)

( * ) Notice: Subject to any disclaimer, the term of this patent is extended or adjusted under 35 U.S.C. 154(b) by 242 days.

(21) Appl. No.: 11/445,663

(22) Filed: Jun. 2, 2006

(65) Prior Publication Data

US 2006/0273597 A1 Dec. 7, 2006

Related U.S. Application Data

(60) Provisional application No. 60/687,622, filed on Jun. 3, 2005.

(51) Int. Cl.
*F03D 1/02* (2006.01)
(52) U.S. Cl. .................... 415/60; 415/71; 415/908; 416/121
(58) Field of Classification Search .............. 415/4.1, 415/4.3, 4.5, 60, 71, 905, 908, 909; 416/9, 416/120, 121, 122, 130, DIG. 4
See application file for complete search history.

(56) References Cited

U.S. PATENT DOCUMENTS

| 756,372 | A | | 4/1904 | Johnson |
|---|---|---|---|---|
| 1,057,233 | A | | 3/1913 | DeGeofroy |
| 1,876,595 | A | | 9/1932 | Beldimano |
| 2,418,439 | A | | 4/1947 | Wetherill |
| 3,726,476 | A | * | 4/1973 | Porter et al. ............ 238/10 E |
| 3,908,695 | A | | 9/1975 | Dunbar |
| 4,088,419 | A | | 5/1978 | Hope et al. |
| 4,140,433 | A | | 2/1979 | Eckel |
| 4,156,579 | A | | 5/1979 | Weisbrich |
| 4,156,580 | A | | 5/1979 | Pohl |
| 4,236,083 | A | | 11/1980 | Kenney |
| 4,288,199 | A | | 9/1981 | Weisbrich |
| 4,348,594 | A | | 9/1982 | Lipfert |
| 4,421,452 | A | | 12/1983 | Rougemont |

(Continued)

FOREIGN PATENT DOCUMENTS

WO  WO02/084115  7/2002

(Continued)

OTHER PUBLICATIONS

International Search Report from co-pending International Application No. PCT/US2006/021791 with an International Filing Date of Jun. 5, 2006; claiming benefit of U.S. Appl. No. 60/687,622, filed Jun. 3, 2005 entitled "Wind Harnessing System" (Applicant: Cleveland State University).

(Continued)

*Primary Examiner*—Edward Look
*Assistant Examiner*—Dwayne J White
(74) *Attorney, Agent, or Firm*—Calfee, Halter & Griswold LLP

(57) ABSTRACT

A wind harnessing system comprises a substantially helical structure including at least a portion of a spiraling groove and at least one energy converter positioned at least partially within the portion of the spiraling groove. In other embodiments, wind grooves formed by adjacent bands which are fixed with respect to one another, carry energy converters which are moveable with respect to these fixed bands.

16 Claims, 5 Drawing Sheets

U.S. PATENT DOCUMENTS

| | | |
|---|---|---|
| 4,540,333 A | 9/1985 | Weisbrich |
| 4,702,324 A | 10/1987 | Peinecke et al. |
| 4,708,592 A | 11/1987 | Krolick et al. |
| 4,725,194 A | 2/1988 | Bartsch |
| 4,764,683 A | 8/1988 | Coombes |
| 5,062,765 A | 11/1991 | McConachy |
| 5,137,417 A | 8/1992 | Lund |
| 5,313,103 A | 5/1994 | Hickey |
| 5,520,505 A * | 5/1996 | Weisbrich .......... 415/4.1 |
| 6,132,172 A | 10/2000 | Li |
| 6,158,953 A | 12/2000 | Lamont |
| 6,278,197 B1 | 8/2001 | Appa |
| 6,519,901 B1 | 2/2003 | Nelson et al. |
| 6,626,638 B2 | 9/2003 | Rosefsky |
| 7,152,519 B2 | 12/2006 | Dubreuil |
| 2002/0180216 A1 | 12/2002 | McDavid |

FOREIGN PATENT DOCUMENTS

| | | |
|---|---|---|
| WO | WO 02/084115 | 10/2002 |

OTHER PUBLICATIONS

Eneco, "Wind Amplified Rotor Platforms", http://www.warp-eneco.com/warp.php, Accessed on the World Wide Web on Oct. 30, 2006, p. 1-3.

Blevins, Robert D., "Flow Induced Vibration," Fig. 3-21(a) and accompanying text; Rao, S.S., Mechanical Vibration 4th Ed. , Figs. 3.30(a) and 3.30(b).

International Search Report and Written Opinion from PCT/US2008/068888 mailed Sep. 3, 2008.

International Search Report and Written Opinion for PCT/US08/63151, mailed Aug. 7, 2008.

* cited by examiner

WIND HARNESSING SYSTEM

PRIORITY CLAIM

This application claims priority to U.S. Provisional Patent Application No. 60/687,622, entitled "Wind Energy Converter Apparatus," which was filed Jun. 3, 2005. Application No. 60/687,622 is incorporated herein by reference in its entirety.

BACKGROUND OF INVENTION

The present invention relates to devices for use in collecting wind energy. Harnessing energy through the collection of wind power is an attractive alternative energy source when compared with other forms of energy collection. For example, energy collection through the burning of fossil fuels depletes limited natural resources and creates pollution. In contrast however, wind energy is a renewable power source and collecting it generates minimal pollution.

SUMMARY OF THE INVENTION

A wind harnessing system comprises a substantially helical structure including at least a portion of a spiraling groove and at least one energy converter positioned at least partially within the portion of the spiraling groove. In other embodiments, wind grooves formed by adjacent bands which are fixed with respect to one another, carry energy converters which are moveable with respect to these fixed bands.

DETAILED DESCRIPTION OF THE INVENTION

Figure 1:
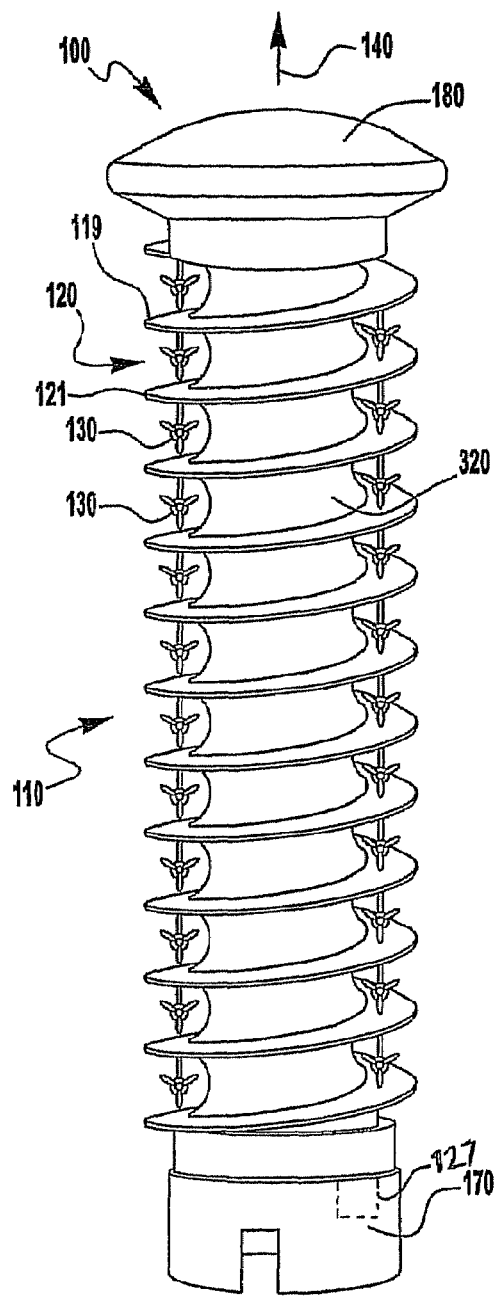
FIG. 1 illustrates one embodiment of the inventive wind harnessing system viewed from the windward side.

For the purposes of this disclosure, "invention" and "inventive" refer to the legal invention defined by the combination of features recited in the attached claims in their final form (i.e. after completion of examination), with no additional features being added thereto. In contrast, "embodiment" refers to specific examples of this legal invention such as illustrated in the drawings and otherwise described in this disclosure.

Figure 2:
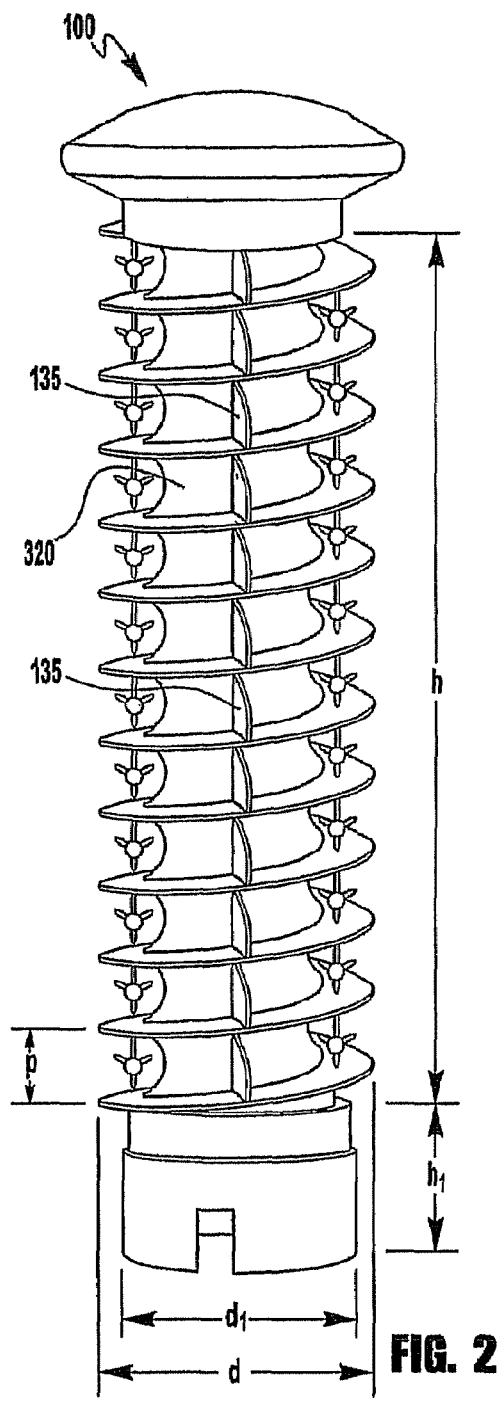
FIG. 2 illustrates the wind harnessing system of FIG. 1 when viewed from the leeward side.

As shown in FIGS. 1 and 2, one embodiment of the inventive wind harnessing system 100 includes helical structure 110 and spiraling groove 120 defined by adjacent spiraling threads 119 and 121 which spiral around central core 320 of helical structure 110 and are preferably stationary with respect to one another. In the particular embodiment shown, spiraling groove 120 extends about twelve revolutions around longitudinal axis 140 of central core 320, although any number of full or partial revolutions around central core 320 are possible depending on the desired application. In addition, spiraling groove 120 need not form complete revolutions around central core 320 of the helical structure. In other words, partial revolutions can also be used.

The helical structure of the wind harnessing system may be fabricated from any construction materials and/or processes. A non-limiting example is a frame with a skin covering assembly. The skin covering assembly may be constructed of, for example, fiberglass, aluminum, fabric, canvass, paper, plastics, polymers, or combinations thereof. Various construction methods such as, for example, a plurality of unibody structures that may be field assembled to obtain the desired number of revolutions, or attaching a helical fin structure to a cylinder shell may be used. Particular materials and methods used in fabrication of the helical structure depend on the construction application employed.

The overall size and shape of the helical structure depends on the particular application. In one embodiment, helical structure 110 of about one-hundred and thirty feet in height, h, and about thirty feet in diameter, d, having about eleven feet in pitch, p, is utilized. Obviously, helical structure 110 may have a different height, h, diameter, d, and pitch, p, depending on the application. Further, in other embodiments not shown, the diameter of the substantially helical structure need not be constant throughout the structure. For example, embodiments of the wind harnessing system may include a substantially helical structure that has a conical profile.

As further shown in FIGS. 1 and 2, energy converters 130 are positioned at least partially within spiraling groove 120 of helical structure 110. Energy converters 130 may be any device used in converting the energy of the wind into electrical energy. In the illustrated embodiments, energy converters 130 are turbines having blades with a propeller diameter of about six to ten feet. Alternate embodiments of the wind harnessing system may include one or more energy converters with larger or smaller dimensions depending on the desired application.

As shown in FIG. 2, wind harnessing system 100 includes baffles 135 that are positioned at least partially within spiraling groove 120 of helical structure 110. Baffles 135 at least partially inhibit wind from traveling up spiraling groove 120. Inhibiting wind flow from traveling up spiraling groove 120 of helical structure 110 prevents the wind from decreasing the wind velocity around energy converters located above lower baffles. Embodiments without baffles 135 are also contemplated, as well as embodiments that include one or more baffles 135. In some embodiments, baffle(s) 135 may also be used to aid in directing energy converter(s) 130 into the prevailing wind.

As shown in FIGS. 1 and 2, wind harnessing system 100 of this embodiment also includes optional base 170 for supporting, and optional roof 180 for capping, helical structure 110. It should be apparent to one skilled in the art that roof 180 need not be any particular shape or form, or even exist at all. The illustrated embodiment of wind harnessing system 100 includes base 170 having a height, $h_1$, and a diameter, $d_1$. For one application, base 170 of about thirty feet in height, $h_1$, and about twenty-five feet in diameter, $d_1$, may be used. Base 170 may have a different height, $h_1$, and a different diameter, $d_1$, depending on the application. Base 170 need not position helical structure 110 at any particular elevation, or even be an elevated base, as helical structure 110 may start at ground level.

Figure 3:
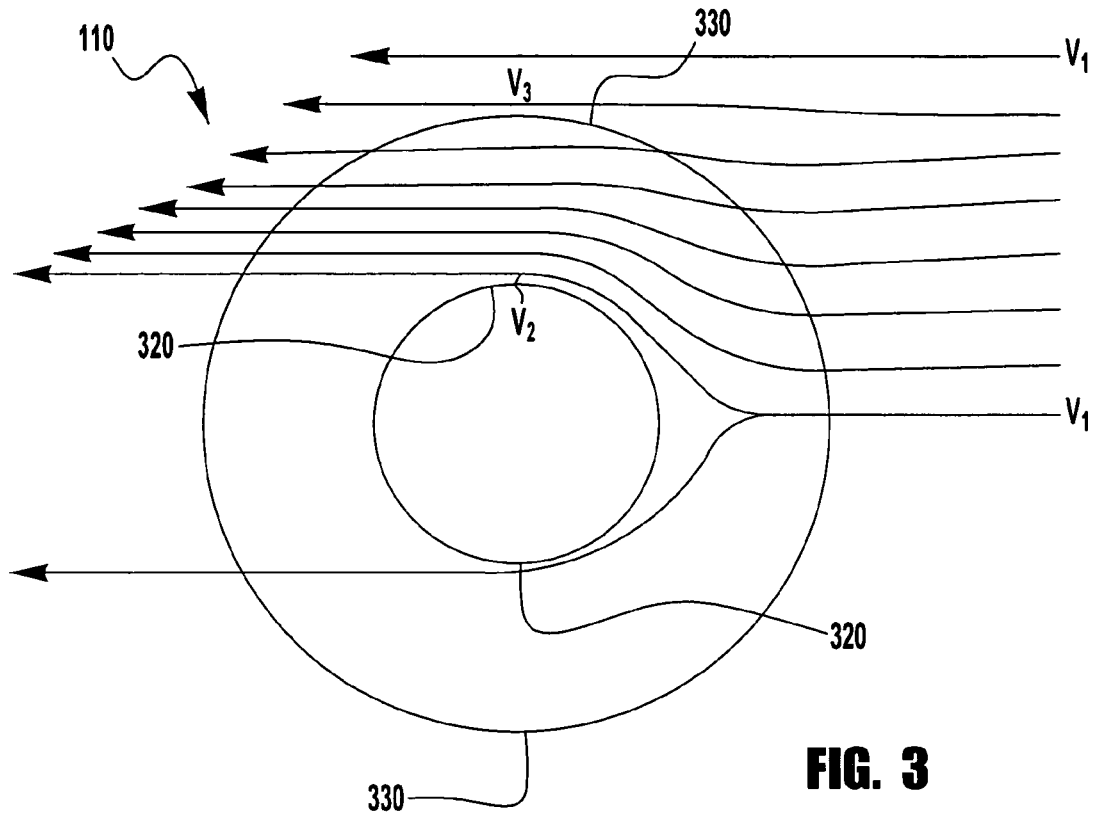
FIG. 3 is a schematic illustration of the wind flow velocity profile of wind traveling through a portion of the spiraling groove of the wind harnessing system of FIGS. 1 and 2.

FIG. 3, which illustrates an exemplary wind flow velocity profile near helical structure 110, shows that the shape of helical structure 110 amplifies or increases wind velocity flowing near the structure. Thus, wind flow approaches helical structure 110 at a velocity $v_1$ and then diverges at $v_2$ around central core 320 of helical structure 110. (The wind flow travels around both sides of helical structure 110, although the wind flow velocities are only shown for one side.) As the wind flows past helical structure 110, in the area closest to central core 320, the velocity $v_2$, is greater than the velocity $v_1$. In this case velocity $v_2$ is approximately 1.8 times velocity $v_1$. However, the velocity $v_3$ near crest or ridge 330 of helical structure 110 is approximately equal to velocity $v_1$. The velocity of the wind flow in the area between central core 320 and ridge 330 averages between velocity $v_1$ and velocity $v_2$. Thus, the wind flow velocity near helical structure 110 has a velocity of up to approximately 1.8 $v_1$. Energy converter(s) located at least partially within a portion of a spiraling groove will be subject to higher wind velocities than if they were located outside the spiraling groove.

By locating energy converter(s) at least partially within the spiraling groove of the helical structure, the wind harnessing system takes advantage of this increased wind velocity. Since wind power conversion is cubically related to wind speed, a two fold increase in wind velocity results in an eight fold increase in energy output. Thus, the incremental increase in wind velocity passing over the energy converter(s) results in a system that harnesses increased wind energy.

Preferably, energy converters 130 are positioned to face into the prevailing wind. Two methods, rotating helical structure 110, and rotating energy converters 130, are discussed below. In one embodiment of the wind harnessing system, the helical structure may be rotatably mounted upon a base to allow at least partial rotation of the helical structure. For example, the structure may rest upon a rotator 127 that may be used to rotate the helical structure about its longitudinal axis into a desired position so that the energy converters are facing into the wind. The rotation may be powered by an external motive source, such as an electric motor, or by the wind ("freely rotatable").

Free rotation may be achieved through the use of any mounting system allowing a low friction rotation of the helical structure upon a base. At least one baffle, as described above, may be located at least partially within the spiraling groove of the helical structure. As shown in FIG. 2, baffles 135 are preferably located downstream (i.e., the leeward side) of energy converters 130 so that they also may act as a sail to position fixed energy converters 130 into (i.e., facing) the wind in addition to blocking the wind flow from traveling up spiraling groove 120. Optionally, the freely rotatable helical structure may be provided with a speed regulating device to prevent sporadic wind gusts from rotating the system too fast. In alternate embodiments the helical structure may be fixed to the base in a non-rotatable fashion, and the energy converter (s) may be moveably mounted to face into the wind flow.

Figure 5:
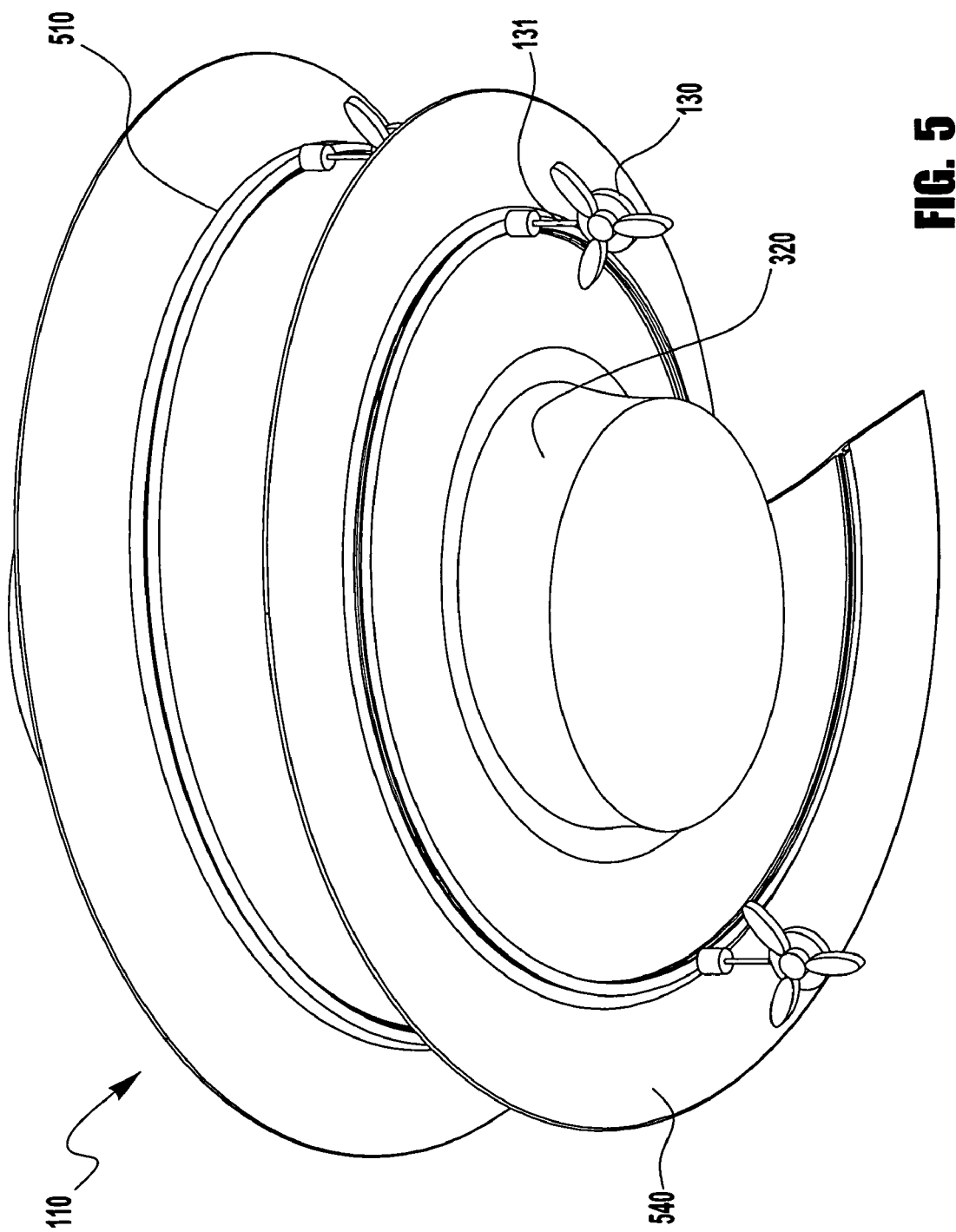
FIG. 5 is a upward-looking perspective view illustrating the manner in which the energy converters are mounted to a portion of a helical structure of an embodiment of the wind harnessing system.

Energy converters 130 need to be located at least partially within spiraling groove 120 of helical structure 110. As explained above, this location allows energy converters 130 to take advantage of the amplified wind velocity provided by the shape of helical structure 110. FIG. 5 illustrates another embodiment of the inventive wind harnessing system in which energy converters 130 are mounted on, or supported from, track 510 on the underside of thread 540 of helical structure 110. In alternate embodiments (not shown), energy converters 130 may be mounted on, or supported from, thread 540 of helical structure 110 that is located below energy converter 130, or be mounted on, or supported from, central core 320 of helical structure 110. In yet other embodiments, energy converters 130 may mount to multiple locations, such as, for example on both the threads above and the threads below the location of energy converter 130. Energy converters 130 may be mounted in any manner as long as they are mounted at least partially within spiraling groove 120 of helical structure 110.

In the embodiment illustrated in FIG. 5, energy converters 130 are carried by mounting arms 131 which are moveably mounted on monorail or track 510 running along the underside of thread 540 of the spiraling groove. A drive mechanism (not shown) moves energy converters along track 510 for positioning these energy converters into the wind without rotation of helical structure 110.

In the particular embodiment shown, energy converters 130 are mounted on mounting arms 131 so that they always face tangentially with respect to track 510. With this arrangement, energy converters 130 will face directly into wind approaching from a direction perpendicular to the radius the helical structure intersecting this tangent. In other embodiments, energy converters can be mounted to rotate about mounting arms 131 so that they can be moved to face directly into the wind solely by this rotation, i.e., without rotating helical structure 110 and without moving these energy converters along track 510. Baffles (not shown) may also be moveably mounted on track 510. Track 510 allows attachment of baffles to the drive mechanism so the baffles move with energy converters 130 and thus remain downstream of energy converters 130 in wind flow.

Energy converters 130 and baffles may be mounted on trolleys that ride on track 510 and are mechanically linked to one another by, for example, chains and intermediate trolleys, allowing for all of the energy converters and baffles to be moved together. Optionally, groups of energy converters may be linked together and moved in groups. Still yet, each energy converter 130 may be individually moveable around helical structure 110.

Various drive mechanisms may be used to move energy converter(s) 130 and/or baffle(s) 135 individually or collectively. For example, the drive mechanism may include one or more motorized trolleys, a pulley and cable system, or any means that allow energy converters 130 to be moved along track 510 about helical structure 110. Optional drive systems may include, for example, electrically driven or hydraulically driven systems.

In still another embodiment of the inventive wind harnessing system, energy converters 130 and baffles 135 may be removed from helical structure 110 by moving them along track 510 to one end of helical structure 110. Once they reach the end (preferably the bottom) of helical structure 110, energy converters 130 and baffles 135 may be removed from track 510 for maintenance or replacement. Another embodiment includes access doors (not shown) in the helical structure for access to energy converters and baffles.

Figure 4:
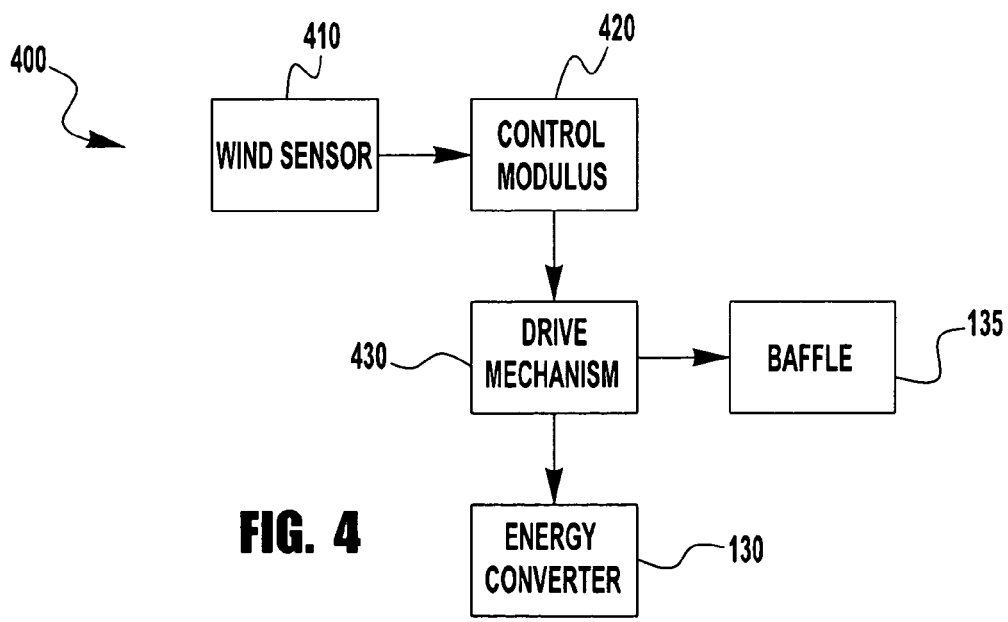
FIG. 4 is a high level schematic diagram of a control system for use in the inventive wind harnessing system.

FIG. 4 illustrates control system 400 that may be employed for positioning energy converter(s) 130 and baffle(s) 135 along track 510. Wind direction sensor 410 detects the direction of the prevailing wind flow. Control modulus 420 receives the input from wind direction sensor 410, and transmits the appropriate signals to drive mechanism 430. Drive mechanism 430 positions energy converter(s) 130 and baffle (s) 135 into the prevailing wind flow.

Figure 6:
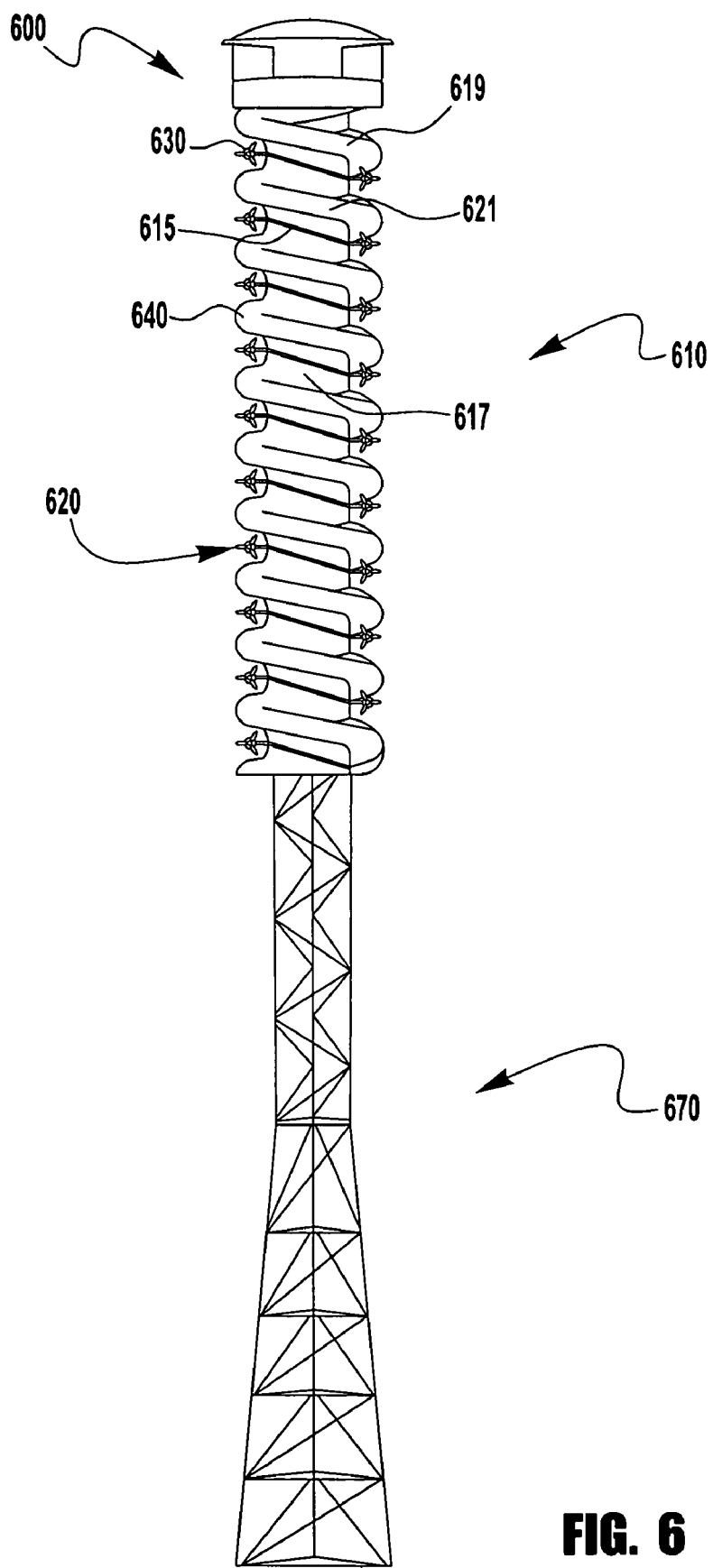
FIG. 6 is an illustration of another embodiment of a wind harnessing system.

FIG. 6 depicts yet another embodiment of the inventive wind harnessing system. In this embodiment, wind harnessing system 600 includes base 670 having a tower arrangement, and helical structure 610. Helical structure 610 has spiraling groove 620 with rounded threads 640. Energy converters 630 and the baffles (not shown) are moveably mounted on track 615 that is attached to central core 617 of the helical structure midway between threads 619 and 621 which define spiraling groove 620.

Figure 7:
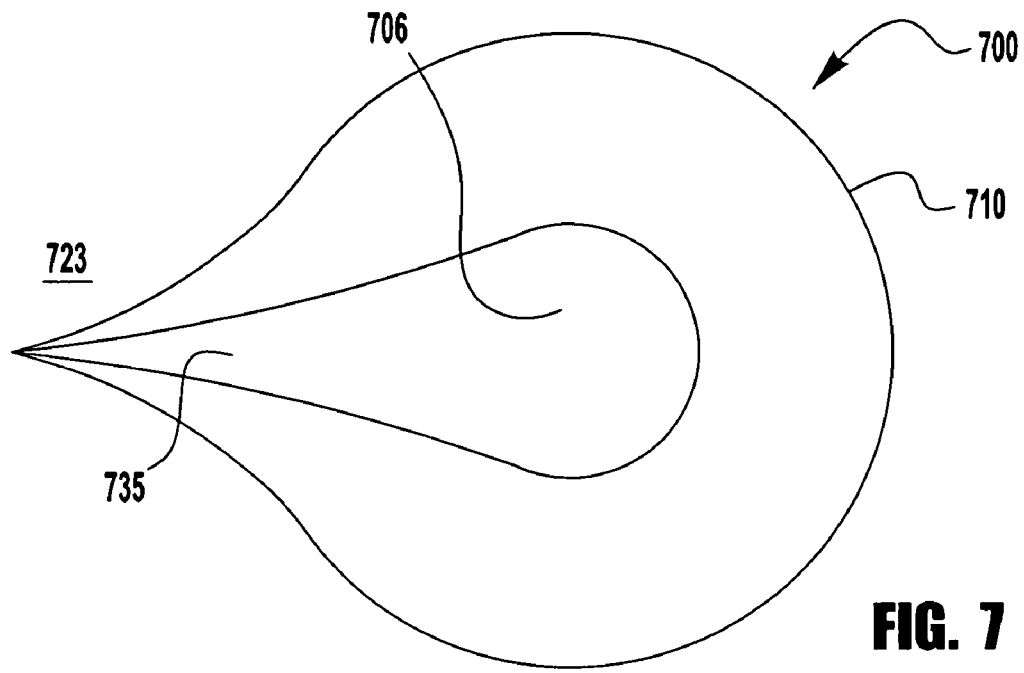
FIG. 7 is a top view of a substantially helical structure of another embodiment of a wind harnessing system.
Figure 8:
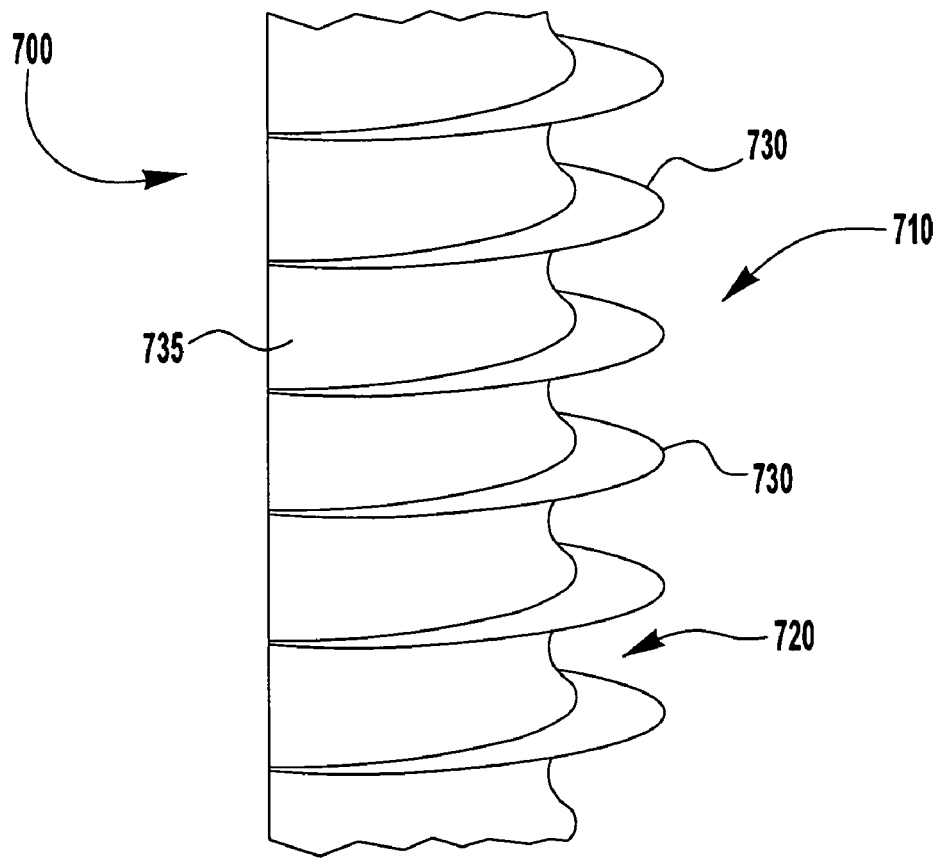
FIG. 8 is a side view of a portion of the embodiment of a wind harnessing system depicted in FIG. 7.

FIGS. 7 and 8 illustrate still another embodiment of the inventive wind harnessing system 700 in which central core 706 of helical structure 710 has a teardrop configuration (FIG. 7) whereby leeward side 723 of the structure defines baffle portion 735 therein. In the particular embodiment shown, baffle 735 extends continuously from the top to the bottom of helical structure 710. However, it is also possible for baffle 735 to be discontinuous and, in addition, to extend along less than the entire height of the helical structure. In this embodiment, spiraling groove 720 is formed by adjacent threads or flights 730 which extend partially around helical structure 710 and connect to and terminate at wedge shaped baffle 735 instead of forming complete revolutions.

Although the present invention has been described with respect to specific embodiments, many modifications can be made without departing from the spirit and scope of the invention. For example, instead of helically arranged threads and grooves, planar threads or bands (preferably arranged perpendicular to axis 140) can be used such that adjacent pairs of these planar threads define separate grooves therebetween. Such bands can be stationary with respect one another, with the energy converters being moveable for facing into the wind by movement along a track as shown in FIG. 5, for example, or by rotating about respective vertical axes. All such modifications are intended to be included within the scope of the present invention, which is to be limited only by the following claims.

The invention claimed is:

1. A wind harnessing system comprising:
a substantially helical structure having at least a portion of a spiraling groove defined between adjacent revolutions of a substantially continuous inclined planar member that wraps around and projects from a central core, the inclined planar member being angled with respect to a ground plane, such that the adjacent revolutions of the spiraling groove are separated by the planar member;
at least one energy converter positioned at least partially within the portion of the spiraling groove, the energy converter comprising an electrical generator and a wind powered turbine, the generator being configured to generate electrical power from rotation of the turbine.

2. The wind harnessing system of claim 1, further comprising a control system for positioning the at least one energy converter into the prevailing wind.

3. The wind harnessing system of claim 1, wherein the portion of the spiraling groove comprises a plurality of revolutions.

4. The wind harnessing system of claim 1, wherein the helical structure comprises a track, wherein the at least one energy converter is moveably mounted on the track.

5. The wind harnessing system of claim 4, wherein the track spirals around the substantially helical structure.

6. The wind harnessing system of claim 4, further comprising at least one baffle moveably mounted to the track and located at least partially within the portion of the spiraling groove.

7. The wind harnessing system of claim 6, wherein a control system positions the at least one energy converter and the at least one baffle.

8. The wind harnessing system of claim 1, further comprising a rotator, wherein the rotator at least partially rotates the substantially helical structure.

9. The wind harnessing system of claim 8, further comprising at least one baffle mounted at least partially within the portion of the spiraling groove, wherein the at least one baffle at least partially inhibits wind from flowing up the spiraling groove.

10. The wind harnessing system of claim 9, wherein a control system controls the rotation of the substantially helical structure.

11. The wind harnessing system of claim 9, wherein the substantially helical structure is mounted on a base that is freely rotatable.

12. An apparatus for harnessing wind power comprising:
a structure having a helical band configured as a substantially continuous inclined planar member that wraps around and projects from a central core, the inclined planar member being angled with respect to a ground plane, such that the adjacent revolutions of the helical band are separated by the planar member;
a track mounted to the helical band, and
at least one energy converter movably mounted on the track and positioned at least partially within an outer perimeter of the helical band, the energy converter comprising an electrical generator and a wind powered turbine, the generator being configured to generate electrical power from rotation of the turbine.

13. The apparatus according to claim 12, further comprising at least one baffle moveably mounted at least partially within the outer perimeter of the helical band.

14. The apparatus according to claim 13, further comprising a control system to position the at least one energy converter and the at least one baffle as a function of wind direction.

15. The apparatus according to claim 13, further comprising a rotator, wherein the rotator allows for at least partial rotation of the structure.

16. The apparatus according to claim 13, wherein the at least one energy converter and the at least one baffle rotate along the track to the bottom of the helical band.

* * * * *